July 17, 1962 F. M. STOLL 3,044,516
PROTECTIVE DEVICE FOR AIRCRAFT CONTROL SURFACES
Filed March 17, 1960

INVENTOR.
Frank M. Stoll
BY
*McGrew and Edwards*
ATTORNEYS

United States Patent Office 3,044,516
Patented July 17, 1962

3,044,516
PROTECTIVE DEVICE FOR AIRCRAFT CONTROL SURFACES
Frank M. Stoll, 3870 Garrison St., Wheatridge, Colo.
Filed Mar. 17, 1960, Ser. No. 15,698
6 Claims. (Cl. 150—52)

This invention relates to protective devices for aircraft control surfaces, and more particularly to a protective cover for aircraft wings and empennage control surfaces which is easily installed and removed.

Private flying is gaining popularity with a substantial increase in the number of smaller, privately owned aircraft in operation. One of the major expenses in owning and maintaining these privately owned aircraft is the cost of hangaring. In some geographical locations of the world, it is possible to merely "tie-down" an aircraft in such a manner as to prevent unusual velocity gusts of wind from overturning or otherwise damaging the aircraft.

However, in most geographical locations, there are local conditions, seasonal and otherwise, which demand protection of the aircraft control surfaces from moisture, freezing, precipitation, dust and flying sand, and similar conditions which would tend to permanently damage or otherwise affect the aircraft control surfaces as to render them unworkable or otherwise unresponsive to pilot control.

Some conditions, such as sand, grit, abrasive dust and the like, do not immediately render the various control surfaces unresponsive. The sand or abrasive material becomes lodged in areas outside those normally visible during the usual pre-flight check; and, after the craft is airborne, the surfaces may lock out of control or become damaged; or the control cables may be broken by the abrasive rubbing of fine materials lodged in association with the surfaces and control cables, such that they are unresponsive to pilot control.

These problems are particularly prevalent with the use of military aircraft at out-of-the-way locations and where construction of sufficient hangar space to house all aircraft has not been provided.

To overcome the foregoing problems, I have invented simple, easily manufactured and economical protective covering devices for aircraft control surfaces which are capable of rapid installation and removal.

Briefly, my invention comprises a wing tip engaging envelope with a depending portion of considerable length extending therefrom adapted to cover the entire upper surface of an aircraft wing (or other control surface) and overlap or extend around the leading and trailing edges thereof to cover the exposed openings of the control surfaces on the front, rear and lower edges of the wing; and extending from the end of the wing tip envelope to the wing root; and inclusive of rapid connect and disconnect means to maintain a snug glove-like fit of the covering over the control surface on which the devices are mounted.

It is therefore among the objects and advantages of devices according to my invention to provide a lightweight, durable protective covering for aircraft control surfaces.

It is also among the objects of my invention to provide a simple and inexpensive device capable of rapid installation and removal, for protecting aircraft wings and the control surfaces interconnected therewith, and which may be formed into a lightweight, compact package or bundle which may be transported in the plane when not in use.

It is a further specific object of my invention to provide an inexpensive, simple, protective covering device for aircraft control surfaces particularly useful to private aircraft owners and which can withstand substantial atmospheric temperature variation without deterioration.

Further objects and advantages will become increasingly evident to persons skilled in the art, such as aircraft owners, pilots and aircraft mechanics from a reading of the following detailed description with reference to the appended exemplary drawings.

Before describing the drawings in detail, I wish it understood that they are intended merely as exemplary of one manner of practicing my invention, and I do not wish to be limited thereby, but rather by the scope of the hereafter appended claims.

Figure 1:
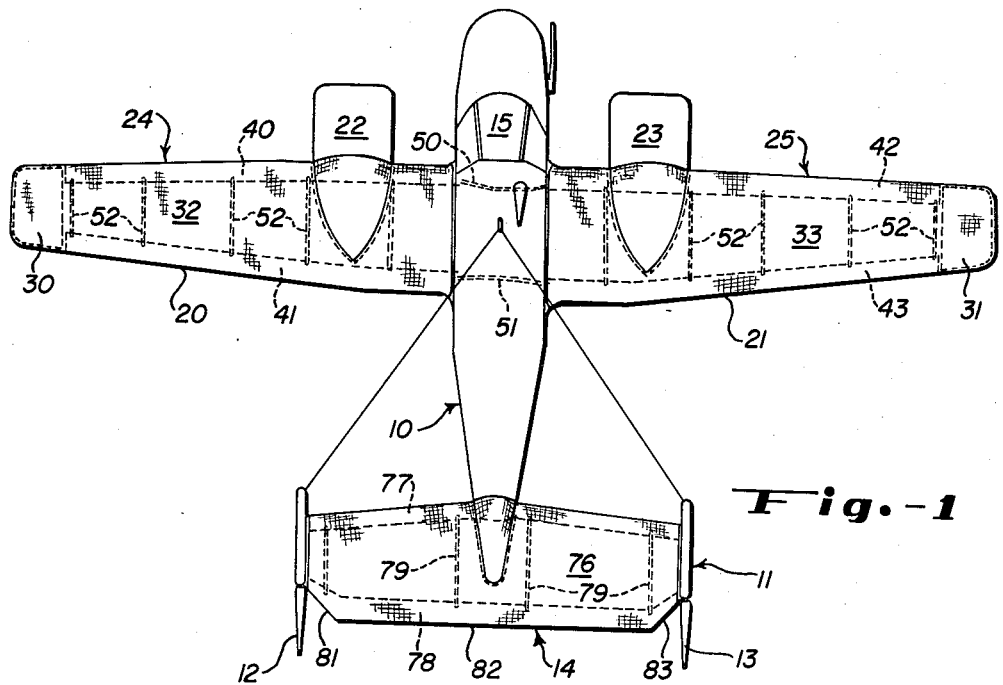
FIG. 1 is a top view of an aircraft having protective covering devices according to my invention mounted thereon.

FIG. 1 shows an aircraft 10 having a suitable empennage section 11 inclusive of vertical stabilizers 12 and 13 and a horizontal stabilizer 14. Forward of the empennage section in the upper portion of the aircraft fuselage is a pilot compartment 15 having therein standard controls and instruments for the pilot which are not shown in the drawings.

Extending from the aircraft fuselage, generally below and to the rear of the pilot compartment, are wings 20 and 21, each having suitably mounted thereon an aircraft engine 22 and 23, respectively. Mounted on the wings 20 and 21 are protective covering devices 24 and 25 constructed according to my invention and formed of suitable lightweight water-impervious material capable of folding into a compact package or bundle without cracking or other deterioration and which is immune to mildew.

Each of the protective covering devices 24 and 25 has an identical envelope-like receptacle 30 and 31, respectively, for snugly fitting over a wing tip in a glove-like relation. Depending generally from the upper portion of the envelopes 30 and 31 (upper referring to the devices as mounted on the upper surface of a wing) are elongated, depending portions 32 and 33 which have overlap portions 40 and 41, and 42 and 43, respectively, for encompassing the leading and trailing edges of the aircraft wings 20 and 21, respectively.

Figure 3:
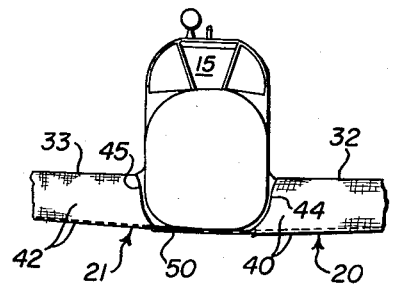
FIG. 3 is a partial front view of the aircraft of FIG. 1.

Referring now to FIG. 3, the overlap edges 40 and 42 of the extending portions 32 and 33 each have a generally S shaped configuration along the edges 44 and 45, respectively, to assure protection of the control surfaces up to where the wings are joined to the aircraft body at the wing root. Of course, although the S shaping is the most commonly employed, where other wing root configurations are present in various other aircraft designs, it is within the scope of my invention to suitably design the edges 44 and 45 for such wing root configurations. Also shown in FIG. 3 is the forward quick connect and disconnect device 50, which is mounted with at least one other similar, rearwardly spaced, device 51 (shown in FIG. 1 in dotted lines), which, in combination with similar quick connect and disconnect devices 52 along the wing (also shown in FIG. 1 in dotted lines), which vary in length according to the progressively lessening wing dimensions from the tip to the root of the wing; all of the foregoing, act together to assure a snug, glove-like fit of the covering device on a wing.

Figure 4:
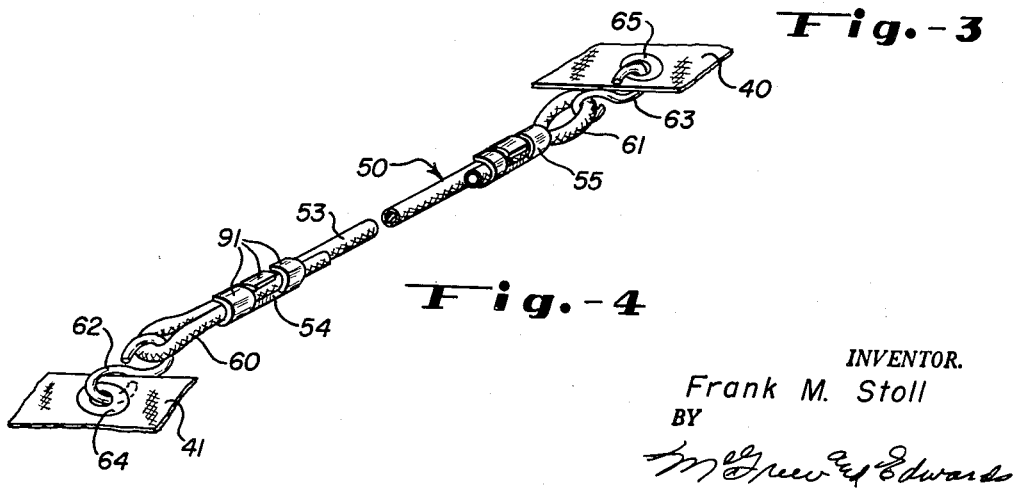
FIG. 4 is an enlarged detail of a quick connect and disconnect means usable with and a component of the novel covering devices of my invention.

Referring to FIG. 4, an enlarged detail of quick connect and disconnect device 50 is shown. Of course, as explained above, all of the devices 52, 51 and 50 are similar, varying in dimensions only; but other devices, or a combination thereof, may be used which exhibit and have the same properties and characteristics as the exemplary ones I have shown. Quick connect and disconnect device 50 is comprised, essentially of a substantially elastic, rope-like member 53 and a pair of similar clamping means 54 and 55 associated therewith, and forming loops 60 and 61 for engaging S rings 62 and 63. An important feature of a quick connect and disconnect device according to my invention is that it allows an element of adjustabiilty in the coverings, deriving from its elasticity and also by adjustment, as shall be explained in detail hereafter.

The S rings 62 and 63 have one end passing through the loops 60 and 61, respectively, and the other end through a suitable reinforcing means, such as the metal eyelets 64 and 65, in the overlap portions 41 and 40, respectively, of the protective cover devices 32 and 33.

Figure 2:
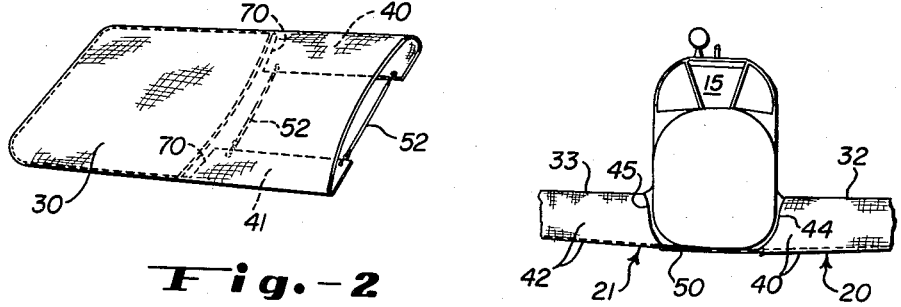
FIG. 2 is an enlarged detail of a portion of the covering of FIG. 1 as associated with the aircraft.

The detail of FIG. 2 illustrates that the overlapping portions 40 and 41 are not entirely connected to the envelope 30, but rather are separated therefrom as is generally indicated by reference character 70. This is an aid to rapid mounting on an aircraft, as shall become apparent hereafter.

Referring again to FIG. 1, and in particular the empennage section 11, there is shown a protective covering device mounted on the horizontal stabilizer and which is within the scope of my invention. This protective device is comprised of an upper covering portion 76 and depending portions 77 and 78 encompassing the leading and trailing edges, respectively, of the horizontal stabilizer when mounted thereon. Quick connect and disconnect devices 79, similar to the devices 52, 51 and 50, are associated therewith to assure a snug, glove-like fit. The trailing edge depending portion 78 forms an envelope, similar in function to the envelopes 30 and 31 of the wing covering devices, and which encompasses the three edges 81, 82 and 83 of the trailing edge of the horizontal stabilizer.

To mount the wing covering devices, the envelopes are fitted over the respective opposite wing tips and the upper depending portions laid out over the upper wing surfaces from wing tip to root with the overlap side portions of the cover hanging freely over the respective leading and trailing edges. Then the quick connect and disconnect devices 50 and 51 are led under the body of the aircraft and fastened between the bottom portions of the respective wing covering overlap portions to apply longitudinal snugness to the respective covers. Thereafter, the quick connect and disconnect devices 52 are fastened under the wings to apply cross-snugness over the wing surfaces. If any of the devices 52, 51 or 50 appear slack, or sufficient tightness does not appear to have been applied to the cover by the respective devices because of expansion or contraction of materials due to temperature changes, or stretching of the components or the like, the tabs 91 of the clamping member 54 (FIG. 4) may be loosened, and slack taken up in the rope-like member 53 as desired. The quick connect and disconnect device 50, of FIG. 4, is used as exemplary in the above, but each of the devices 52 and 51, as well as 50, may be adjusted in a similar manner.

Preferably, covering devices according to my invention are made of polyethylene, nylon laminated sheet material. Such a material is very lightweight, withstands extreme atmospheric temperature variation without deterioration and can be stretched, rolled or folded, wet or dry, without permanent creasing or other damage. It is impervious to moisture and mildew and most solvents with which it is apt to be brought in contact. When dirty, it can be washed with a garden hose, cleans readily, and only requires shaking for removal of surface moisture. All of the metal components, such as the eyelets and clamping devices, are made of a rust and corrosion resistant metal. The portion of the quick connect and disconnect devices, such as the rope-like member 53, are also desirably built of a moisture, heat and mildew resistant material. Of course, although only an empennage section of the type having a pair of vertical stabilizers and a single horizontal stabilizer is shown, it is to be understood that my inventive concept covers the fabrication of protective covering devices for the empennage section wherein there are two horizontal stabilizers and a single vertical stabilizer located therebetween, although such has not been shown in the drawings. In design, protective covering devices for this latter type of empennage section would be merely wing covering devices as shown in the drawings on a reduced scale.

Having thus described one manner of practicing my invention, what I desire to be protected by Letters Patent is set forth in the following claims.

I claim:

1. A protective device for aircraft control surfaces comprising an elongated member having a receptacle portion at one end for receiving an extended portion of an aircraft member having leading and trailing edges, said elongated member having another portion of substantial length extending from said receptacle portion, and having depending portions adapted to encompass the leading and trailing edges of said aircraft member when mounted thereon, and the total length of the elongated member and the portions depending therefrom being sufficient to extend from the said receptacle to the fuselage, and said portions depending from said elongated member being of a configuration adapted to assure protection where the aircraft member joins the fuselage, and quick connect and disconnect devices adapted to interconnect the leading and trailing depending portions and assure a snug fit of the device when in place.

2. A protective device for aircraft control surfaces comprising an elongated member having a receptacle portion at one end for receiving an extended portion of an aircraft member having leading and trailing edges, said elongated member having another portion of substantial length extending from said receptacle portion, and having depending portions adapted to encompass the leading and trailing edges of said aircraft member when mounted thereon and the total length of the elongated member and the portions depending therefrom being sufficient to extend from the said receptacle to the fuselage, and said portions depending from said elongated member being of a configuration adapted to assure protection where the member joins the fuselage, and stretchable quick connect and disconnect devices adapted to interconnect the leading and trailing depending portions and assure a snug fit of the device when in place.

3. A protective device for aircraft control surfaces comprising an elongated member having a receptacle portion at one end for receiving an extended portion of an aircraft member having leading and trailing edges, said elongated member having another portion of substantial length extending from said receptacle portion, and having depending portions adapted to encompass the leading and trailing edges of said aircraft member when mounted thereon and the total length of the elongated member and the portions depending therefrom being sufficient to extend from the said receptacle to the fuselage, said elongated member and associated portions being formed of a waterproof plastic composition capable of withstanding extreme atmospheric temperature variation without deterioration, and said portions depending from said elongated member being of a configuration adapted to assure protection where the member joins the fuselage, and quick connect and disconnect devices adapted to interconnect the leading and trailing depending portions and assure a snug fit of the device when in place.

4. A protective device for aircraft control surfaces adapted to be mounted in pairs, comprising an elongated member having a receptacle portion at one end for receiving an extended portion of an aircraft wing having leading and trailing edges, said elongated member having another portion of substantial length extending from said receptacle portion, and having depending portions adapted to encompass the leading and trailing edges of said wing when mounted thereon and the total length of the elongated member and the portions depending therefrom being sufficient to extend from the said receptacle to the wing root, and said portions depending from said elongated member being of a configuration adapted to be in close proximity to said wing root at the fuselage, and quick connect and disconnect devices adapted to interconnect the leading and trailing depending portions and assure a snug fit of the device when in place.

5. Protective devices for aircraft control surfaces adapted to be mounted in pairs, comprised of a pair of elongated members having a receptacle portion at one end for receiving an extended portion of an aircraft wing having leading and trailing edges, said elongated member having another portion of substantial length extending from said receptacle portion, and having depending portions adapted to encompass said leading and trailing edges of said wing when mounted thereon and the total length of the elongated member and the portions depending therefrom being sufficient to extend from the said receptacle to the wing root, and said portions depending from said elongated member being of a configuration adapted to be in close proximity to said wing root at the fuselage when in place, and quick connect and disconnect devices adapted to interconnect the leading and trailing depending portions and assure a snug fit of the device when in place, and additional quick connect and disconnect devices for interconnecting the respective leading and training edge encompassing depending portions of the devices on opposite wings when the devices are on the aircraft wing.

6. Protective covering devices for aircraft wings adapted to be mounted in pairs, each comprising an elongated member having an envelope-like receptacle portion at one end for receiving a substantial portion of the aircraft wing tip and another portion of sufficient length to extend from said receptacle portion to the wing root over the upper surface of the wing, and having depending portions adapted to encompass the leading and trailing edges of the wing when mounted thereon, and the portions depending from said elongated member being of a configuration at the wing root to assure protection at the fuselage, and quick connect and disconnect devices adapted to interconnect the leading and trailing depending portions and assure a snug fit of the device when in place, and additional quick connect and disconnect devices bridging the fuselage for interconnecting the respective leading and trailing edge encompassing portions of the devices on opposite wings when the devices are in place on the wings of an aircraft.

References Cited in the file of this patent

UNITED STATES PATENTS

| | | |
|---|---|---|
| 2,453,403 | Bogardus | Nov. 9, 1948 |
| 2,609,164 | Dillon | Sept. 2, 1952 |
| 2,723,811 | Blomquist | Nov. 15, 1955 |